UNITED STATES PATENT OFFICE.

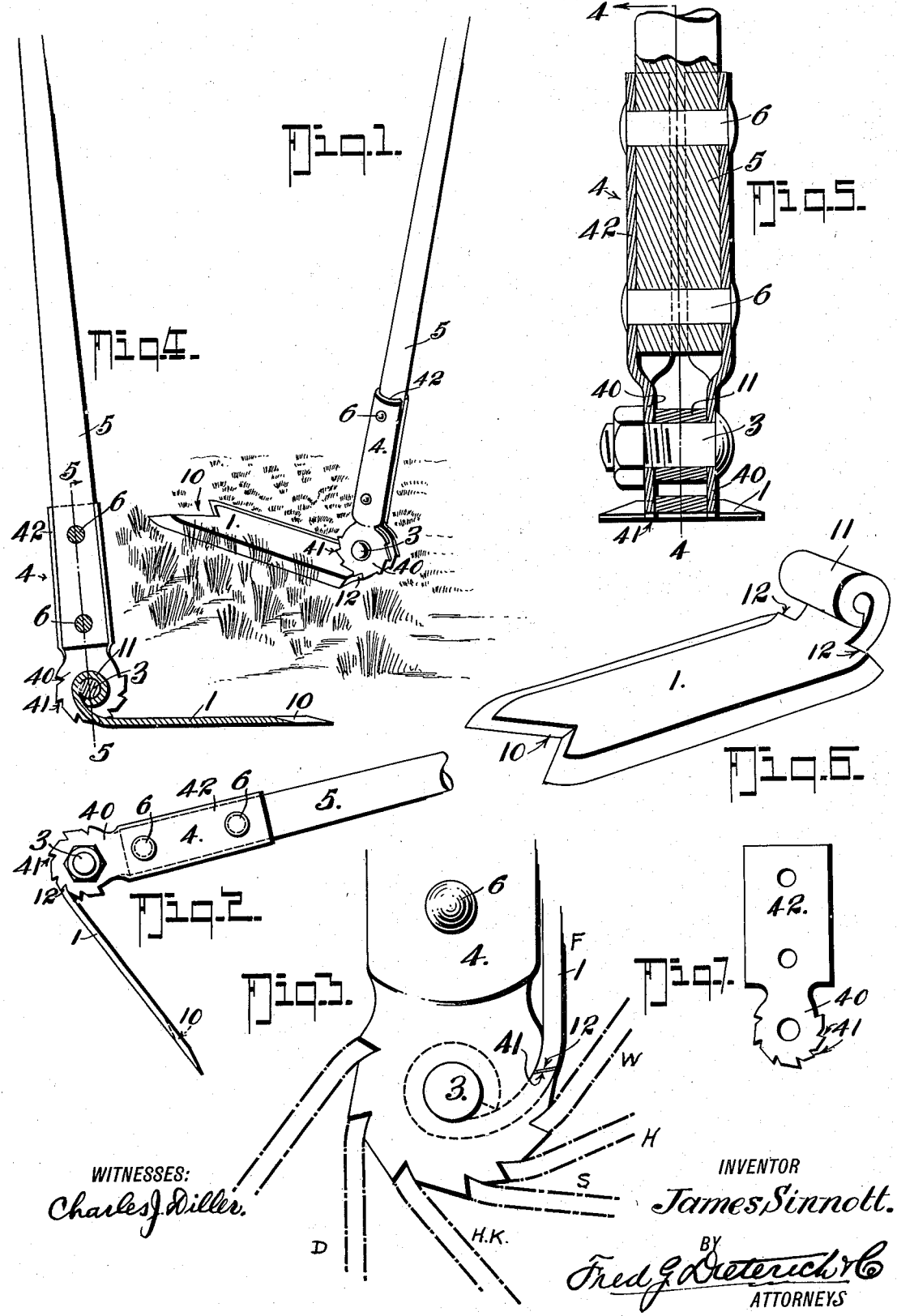

JAMES SINNOTT, OF CHATHAM, ILLINOIS.

GARDEN IMPLEMENT.

1,156,937.  Specification of Letters Patent.  Patented Oct. 19, 1915.

Application filed June 2, 1915. Serial No. 31,754.

*To all whom it may concern:*

Be it known that I, JAMES SINNOTT, residing at Chatham, in the county of Sangamon and State of Illinois, have invented a new and Improved Garden Implement, of which the following is a specification.

This invention, primarily has for its object to provide a simple, inexpensive and easily handled improved garden implement in which is included a handle, a blade, and means for effecting a simple, efficient, and adjustable connection whereby the blade may be projected at different angles to the handle to adapt the same for use as a grass-cutter or sickle, a hoe, a combined weeder and plant thinner, a hedge knife, a weed or root digger and for folding the said blade up against the handle when the implement is not in use.

With other objects in view, that will hereinafter appear, my improved garden implement embodies the peculiar features of construction and novel arrangement of the parts that constitute my invention, hereinafter fully explained, specifically pointed out in the appended claims and illustrated in the accompanying drawing, in which, Figure 1 is a perspective view of my garden implement, the same being shown as a grass cutter. Fig. 2 is a side view of the same arranged as a hoe. Fig. 3 is a diagrammatical view showing the blade in all its different positions, the folded position being in full lines. Fig. 4 is a section in the line 4—4 on Fig. 5. Fig. 5 is a cross section in the line 5—5 on Fig. 4. Fig. 6 is a detail view of the blade, and Fig. 7 is a detail view of one of the blank sections that forms a part of the connecting means hereinafter referred to.

My improved garden implement embodies a handle, a blade, and a means for adjustably connecting the blade to the lower end of the handle, the construction of which forms the essential feature of my invention.

The blade 1, which is sharpened on one or both edges, has one end notched, as at 10, to form a digging or weeding edge and its other end terminates in a tongue like extension that is bent up to form a loop or eye 11, for receiving the bolt 3 that secures it to the connecting means presently referred to, and to also form shoulders 12 for engaging the notched or toothed edges of head portions 40 of the said connecting means, when the parts are assembled for use.

The connecting means referred to, consists of two like resilient opposing members, 4—4 which are preferably stamped and punched up into a blank shape as shown in Fig. 7, by reference to which it will be noticed the member 4 includes a disk like head 40 the peripheral edge of which is punched with a series of arbitrarily arranged teeth or notches 41, of which seven are shown, the purpose of which will presently appear. Members 4 also include extensions 42 that are bent to form half ferrule like sections for embracing the lower end of the handle 5, to which they are secured by the rivets 6 as clearly shown in Fig. 5.

3 designates a bolt for engaging the bolt apertures in the heads 40 and which forms the hanger on which the looped end of the blade is mounted when applied for any of its adjusted positions, the same being securely held to any of its set positions by reason of its shoulders 12 engaging the notches or teeth in the heads 40 against which they are held by the nut 8 that engages the bolt 3 as shown.

In the drawing, the heads 40 are shown with seven sets of notches or teeth 41, it being understood that a more or less number of sets of teeth or notches may be used, and the said notches are arranged to project the blade from the handle to produce the desired character of implement, excepting when the blade is adjusted (see position F, Fig. 3) for engagement with the first notch, and when thus adjusted it is folded up against the handle out of use.

By referring now more particularly to the diagram Fig. 3, which indicates the various positions to which the blade may be set, when the blade is set at position W, to engage the second notch, the implement is a weeder or plant thinner; when secured in the third set of notches the implement is a hoe, see Fig. 2, and H, Fig. 3, and when in the fourth set of notches see position S Fig. 3 the blade acts as a sickle or grass cutter.

To provide against any portion of the toothed edges of the heads 40 projecting below the blade when the latter is used as a sickle or grass cutter as shown in Figs. 1 and 4, the loop or eye end of the blade is sufficiently extended above the blade to provide for such swinging of the blade 1 relatively to the bolt 3, that the said blade when held to the sickle or grass cutting position has its lower face flush with the outer or peripheral edge of the disks.

When the blade is adjusted as shown by dotted lines H, K, Fig. 3 to the fifth notch in the heads 40 the same will readily serve as a hedge knife and when set in either the sixth or seventh notches as indicated by dotted lines D, D, on Fig. 3, it readily serves as a digger for prying up roots and weeds.

From the foregoing taken in connection with the drawing the complete construction, the manner of adjusting the several parts that constitute my invention, and the advantages thereof will be readily understood.

To set the blade to any of its desired adjustments it is only necessary to loosen and withdraw the bolt 3, set the blade into the particular set of notches desired, to restore and tighten the bolt 3.

What I claim is:

1. A garden implement comprising a handle having a bifurcated head, the said head having arbitrarily arranged sets of peripheral notches, a blade including a curved portion that terminates in an eye, said blade having oppositely disposed shoulders for engaging the sets of notches in the handle head, a clamp bolt engaging the bifurcated head of the handle, and the eye of blade, one set of the said notches, the curved portion of the blade, and the pivotal connection for the blade, being relatively arranged so that the blade is foldable flatwise against the handle.

2. A garden implement comprising a handle, a blade, and means for adjustably connecting the blade whereby the said blade may be positioned to project at any angle to the handle, said means comprising oppositely disposed heads pendent from the handle, a combined pivot and clamp bolt for engaging the heads, said heads having arbitrarily arranged opposite sets of peripheral notches, the blade having opposite shoulders and a loop member between the shoulders for pivotally engaging the bolt, said loop member. the inner edge of the blade, and the pivot bolt being relatively so arranged that said edge of the blade is flush with the peripheral edges of the notched heads.

3. A garden implement comprising a handle, a pair of oppositely disposed resilient disks secured to and pendent from the lower end of the handle, a bolt and clamp nut cooperating with the disks, the said disks each having a series of radial notches in their peripheral edges, an edge sharpened blade one end of which terminates in a digging element, the other end of which has oppositely disposed shoulders and an extension projected from the shouldered portions, the said extension being curved upwardly and terminating in an eye, that pivotally engages the clamp bolt, the shoulders and the extension of the blade being relatively arranged whereby the blade can be adjusted to bring the shoulders of the blade into engagement with any set of the peripheral notches in the disk members of the handle.

JAMES SINNOTT.